(12) United States Patent
Qu et al.

(10) Patent No.: US 11,679,358 B2
(45) Date of Patent: Jun. 20, 2023

(54) SYSTEM AND METHOD FOR TREATING FLUE GAS OF BOILER BASED ON SOLAR ENERGY (71) Applicant: Xi'an Jiaotong University, Xi'an (CN)

(72) Inventors: Zhiguo Qu, Xi'an (CN); Di Tian, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 17/739,110

(22) Filed: May 7, 2022

(65) Prior Publication Data
US 2023/0095524 A1 Mar. 30, 2023

(30) Foreign Application Priority Data

Sep. 29, 2021 (CN) .......................... 202111167907.3

(51) Int. Cl.
| | |
|---|---|
| B01D 53/32 | (2006.01) |
| B01D 47/06 | (2006.01) |
| B01D 50/60 | (2022.01) |
| B01D 53/62 | (2006.01) |
| C25B 3/26 | (2021.01) |
| C25B 15/08 | (2006.01) |
| C10G 2/00 | (2006.01) |
| C25B 3/03 | (2021.01) |

(52) U.S. Cl.
CPC .......... *B01D 53/326* (2013.01); *B01D 47/06* (2013.01); *B01D 50/60* (2022.01); *B01D 53/62* (2013.01); *C10G 2/34* (2013.01); *C25B 3/03* (2021.01); *C25B 3/26* (2021.01); *C25B 15/081* (2021.01); *B01D 2257/504* (2013.01); *B01D 2258/0283* (2013.01)

(58) Field of Classification Search
CPC ........ C10G 2/34; B01D 53/326; B01D 47/06; B01D 50/60; B01D 53/62; B01D 2257/504; B01D 2258/0283; C25B 3/26; C25B 3/03

See application file for complete search history.

(56) References Cited

U.S. PATENT DOCUMENTS

2020/0291901 A1* 9/2020 Song .................. B01D 53/1418

* cited by examiner

*Primary Examiner* — Jafar F Parsa (74) *Attorney, Agent, or Firm* — Chiesa, Shahinian & Giantomasi PC (57) ABSTRACT A system and method for treating flue gas of a boiler based on solar energy are provided, wherein a heat pump is connected with a heat collector via first and second valves, a carbon dioxide electrolysis chamber is connected with a flue gas pretreatment chamber and a power distribution control module for electrolyzing and reducing carbon dioxide, a gas phase separation chamber is connected with a gas phase outlet to separate a mixture, and discharge the separated gas phase products; a Fischer-Tropsch reaction chamber is connected with the gas phase separation chamber to pass the separated carbon monoxide and hydrogen into a flowing reaction cell, a liquid phase product separation chamber is connected with a liquid phase outlet to separate the liquid phase hydrocarbon fuel products, and separate and supplement electrolyte; an electrolyte cooling circulation chamber is connected with the liquid phase product separation chamber.

18 Claims, 2 Drawing Sheets

SYSTEM AND METHOD FOR TREATING FLUE GAS OF BOILER BASED ON SOLAR ENERGY

CROSS REFERENCE TO RELATED APPLICATION

This application claims the priority of Chinese Patent Application No. 202111167907.3, entitled "SYSTEM AND METHOD FOR TREATING FLUE GAS OF BOILER BASED ON SOLAR ENERGY" filed with the China National Intellectual Property Administration on Sep. 29, 2021, which is incorporated herein by reference in its entirety.

TECHNICAL FIELD

The disclosure relates to the technical field of power plant flue gas treatment technology, and in particular to a system and method for treating flue gas of a boiler based on solar energy.

BACKGROUND ART

Compositions of flue gas of a boiler are complex, which include nitrogen, carbon dioxide ($CO_2$), oxygen, vapor, sulfur oxides, nitrogen oxides, dust, etc. The sulfur oxides, nitrogen oxides and dust are main sources of air pollution, and the carbon dioxide is a main body of industrial carbon emissions. In order to help environmental protection and control air pollution, there is an urgent need to effectively treat and separate the different components of the flue gas of the boiler.

The molar fraction of the carbon dioxide in the flue gas of coal-fired boilers, for example, is about 12%. The methods for separating the carbon dioxide include absorption, adsorption, low-temperature distillation, membrane separation, etc. The disposal technology of the carbon dioxide is mainly to store the carbon dioxide in abandoned oil and gas wells, aquifers and oceans. However, these separation and disposal technologies do not really reduce $CO_2$ emissions, and $CO_2$ stored underground or in water will also be slowly released. Moreover, these technologies face problems of large transportation costs and complex systems.

The above information disclosed in the background is only for enhancing the understanding of the background of the disclosure, and therefore it may contain information that does not form the conventional art well known to those of ordinary skill in the art.

SUMMARY

The present disclosure intends to provide a system and method for treating flue gas of a boiler based on solar energy. In order to achieve the above effect, the disclosure provides the following technical solutions.

A system for treating flue gas of a boiler based on solar energy includes a solar energy utilization module, a flue gas decarbonization module and an electrolyte circulation module.

The solar energy utilization module includes:
a parabolic concentrator configured to gather sunlight;
a heat collector placed at a focal point of the parabolic concentrator;
a photovoltaic cell attached to the heat collector to absorb the sunlight and photoelectrically convert the sunlight into electrical energy;
a heat pump connected to the heat collector via a first valve and a second valve for thermal circulation; and
a power distribution control module including:
a circuit controller configured to control a operation of a circuit;
a power storage unit configured to store excess electrical energy generated by the photovoltaic cell and supply the electrical energy to outside;
an inverter configured to convert direct current into alternating current; and
a distribution box connected to the inverter to rectify and distribute the electrical energy.

The flue gas decarbonization module includes:
a flue gas pretreatment chamber connected to a flue gas duct of the boiler to remove dust, sulfur oxides and nitrogen oxides from the flue gas and increase humidity of the flue gas;
a carbon dioxide electrolysis chamber connected to the flue gas pretreatment chamber and the power distribution control module for electrolyzing and reducing carbon dioxide in the flue gas by the direct current to generate liquid phase hydrocarbon fuel products and gas phase hydrocarbon fuel products. The carbon dioxide electrolysis chamber includes a liquid phase outlet configured to discharge the liquid phase hydrocarbon fuel products and a gas phase outlet configured to discharge a mixture including the gas phase hydrocarbon fuel products;
a gas phase separation chamber connected to the gas phase outlet to separate carbon monoxide, hydrogen, methane and ethylene from the mixture and discharge separated gas phase products;
a Fischer-Tropsch reaction chamber connected to the gas phase separation chamber to pass the separated carbon monoxide and hydrogen into a flowing reaction cell for a Fischer-Tropsch reaction to generate high hydrocarbons in a liquid phase, and
a first product storage chamber connected to the gas phase separation chamber and the Fischer-Tropsch reaction chamber to store the carbon monoxide, the hydrogen, the methane, the ethylene and the high hydrocarbons.

The electrolyte circulation module includes:
a liquid phase product separation chamber connected to the liquid phase outlet to separate formic acid, methanol and ethanol in the liquid phase hydrocarbon fuel products so as to generate liquid phase products, and separate and replenish electrolyte;
an electrolyte cooling circulation chamber connected to the liquid phase product separation chamber to cool circulated electrolyte; and
a second product storage chamber connected to the liquid phase product separation chamber to store the liquid phase products.

In the system for treating the flue gas of the boiler based on the solar energy, the heat pump includes a compressor, a condenser, a throttle valve and an evaporator. A liquid refrigerant passes through the throttle valve to the evaporator, absorbs heat from the circulated electrolyte therein, and then passes through the compressor. A high-temperature gaseous refrigerant releases heat in the condenser to a working fluid circulated in the heat collector.

In the system for treating the flue gas of the boiler based on the solar energy, the power storage unit includes a lithium battery pack.

In the system for treating the flue gas of the boiler based on the solar energy, the carbon dioxide electrolysis chamber includes an electrocatalytic reduction apparatus formed by bonding a plurality of single electrolytic cells. The single electrolytic cell includes:

an ion exchange membrane;

an anode positioned on a side of the ion exchange membrane;

a cathode positioned on another side of the ion exchange membrane opposite to the anode;

a liquid phase flow path positioned on a side of the anode away from the ion exchange membrane to circulate the electrolyte, and a gas phase flow path positioned on a side of the cathode away from the ion exchange membrane to circulate the flue gas.

In the system for treating the flue gas of the boiler based on the solar energy, material of the anode is a nickel or platinum metal porous media, the ion exchange membrane is an anion membrane, a cation membrane or a bipolar membrane, and the cathode is porous carbon cloth or carbon fiber.

In the system for treating the flue gas of the boiler based on the solar energy, a side of the cathode near the gas phase flow path performs a hydrophobic treatment, a side of the cathode near the ion exchange membrane performs a hydrophilic treatment and the side of the cathode near the ion exchange membrane is loaded with catalyst nanoparticles, and porosity of the cathode decreases from the side near the gas phase flow path to the side near the ion exchange membrane.

In the system for treating the flue gas of the boiler based on the solar energy, the catalyst nanoparticles are nanoparticles of gold, silver, zinc, lead, indium, tin, bismuth, antimony, copper and alloys thereof. The nanoparticles are spherical with a diameter of 1-100 nm and the cathode has a thickness of 1-100 μm.

In the system for treating the flue gas of the boiler based on the solar energy, shapes of the gas phase flow path and the liquid phase flow path are serpentine or cross type; the gas phase flow path has a flow rate of 20-100 sccm and the liquid phase flow path has a flow rate of 20-80 sccm.

In the system for treating the flue gas of the boiler based on the solar energy, the electrolyte is potassium hydroxide, sodium hydroxide, potassium bicarbonate or sodium bicarbonate with a concentration of 0.5-2 mol/L.

A method for treating flue gas of a boiler based on solar energy includes the following steps:

gathering sunlight on a surface of a heat collector at a focal point of a parabolic concentrator; producing a photoelectric effect between the sunlight and a flexible photovoltaic cell attached to the heat collector to generate electricity; cooling a surface photovoltaic cell through an internal working fluid by the heat collector; transmitting a fluid in the heat collector to a heat pump module through a duct to indirectly absorb heat from circulated electrolyte by a compressor and an evaporator; transferring the heat from the circulated electrolyte to the working fluid circulated in the heat collector by the heat pump module; subsequently, transferring heat from a heated high-temperature circulating working fluid to a Fischer-Tropsch reaction chamber through a heat exchanger to supply thermal catalytic reaction in the Fischer-Tropsch reaction chamber;

removing dust, sulfur oxides and nitrogen oxides from the flue gas and increasing humidity of the flue gas by passing the flue gas through a flue gas pretreatment chamber; reducing the flue gas to liquid phase hydrocarbon fuel products and gas phase hydrocarbon fuel products by entering the flue gas into a gas phase fluid path in a carbon dioxide electrolysis chamber, wherein the circulated electrolyte has a temperature of 5-15° C. at an entrance of the carbon dioxide electrolysis chamber;

separating carbon monoxide, hydrogen, methane and ethylene from a mixture comprising the gas phase hydrocarbon fuel products by a gas phase separation chamber; discharging the separated gas phase products and storing the separated gas phase products in a first product storage chamber; wherein the carbon monoxide and the hydrogen enter the Fischer-Tropsch reaction chamber for a Fischer-Tropsch reaction to generate high hydrocarbons in a liquid phase; and separating formic acid, methanol and ethanol from the liquid phase hydrocarbon fuel products by a liquid phase separation chamber to generate liquid phase products and, storing the liquid phase products in a second product storage chamber; wherein electrolyte in the liquid phase separation chamber is recycled through an electrolyte cooling circulation chamber.

In the above technical solutions, the present disclosure provides the system for treating the flue gas of the boiler based on the solar energy with the following beneficial effects: the system and method for treating the flue gas of the boiler based on the solar energy described in the present disclosure realize effective utilizations of solar photothermal and photoelectricity, provide a targeted treatment of the dust, the nitrogen oxides, the sulfur oxides, the carbon dioxide, etc. in the flue gas. Moreover, the present disclosure realizes a resource utilization of the carbon dioxide by means of the carbon dioxide electrolysis chamber, stores intermittent solar energy in hydrocarbon fuel in a form of stable chemical energy, realizes desulfurization, denitrification and emission reduction of the flue gas in a real sense, thereby greatly reducing boiler pollutants as well as carbon emissions. In addition, the disclosure enhances a grade of photothermal energy by means of the heat pump. The electric energy is supplied to electrocatalytically reduce carbon dioxide while the heat required for Fischer-Tropsch reaction is supplied, to improve the energy utilization rate and achieve the purpose of energy conservation and emission reduction.

BRIEF DESCRIPTION OF THE DRAWINGS

In order to more clearly illustrate the technical solutions in the embodiments of the present disclosure or the conventional art, the accompanying drawings required in the embodiments will be briefly described. It is obvious that the accompanying drawings in the following description are only some of the embodiments described in the present disclosure and for those skilled in the art, other accompanying drawings can be obtained according to these drawings.

DETAILED DESCRIPTION OF THE EMBODIMENTS

In order to make the purposes, technical solutions and advantages in the embodiments of the present disclosure clearer, the technical solutions in the embodiments of the present disclosure will be described clearly and completely with reference to the accompanying FIGS. 1-2 of the embodiments in the present disclosure. It is obvious that the embodiments described are a part of the embodiments of the present disclosure, but not all of the embodiments thereof. Based on the embodiments, all other embodiments obtained by those skilled in the art without any creative efforts shall within the scope of the present disclosure.

Therefore, the following detailed description of the embodiments provided in the accompanying drawings is not intended to limit the scope of the present disclosure, but merely indicates selected embodiments of the present disclosure. Based on the embodiments, all other embodiments obtained by those skilled in the art without any creative efforts shall within the scope of the present disclosure.

It should be noted that similar reference numerals and letters indicate similar items in the following figures, so that once an item is defined in one figure, it needs not be further defined and explained in the subsequent accompanying drawings.

In the description of the present disclosure, it is to be understood that the orientations or positional relationships indicated by terms "center", "longitudinal", "transverse", "length", "width", "thickness", "up", "down", "front", "back", "left", "right", "vertical", "horizontal", "top", "bottom", "inside", "outside", "clockwise", "counterclockwise" and so on are based on the orientations or positional relationships shown in the drawings, and are merely intended to facilitate and simplify the description of the disclosure, rather than to indicate or imply that the illustrated device or element must have a particular orientation, or be constructed and operate in a particular orientation, and therefore, they should not be construed as limiting the disclosure.

Furthermore, the terms "first" and "second" are used for the purpose of description only and should not to be construed as indicating or implying relative importance or implicitly specifying the number of indicated technical features. Thus, the features defined as "first" or "second" may explicitly or implicitly include one or more of these features. In the description of the present disclosure, "plurality" means two or more, unless otherwise expressly and specifically limited.

In the present disclosure, unless otherwise expressly specified and limited, the terms "mounted", "attached", "connected", "fixed", etc. shall be used in a broad sense. For example, they may be fixed connections, or removable connections, or integrated, may be directly connected, or indirectly connected through intermediate medium, and may be a connection within two elements or an interactive relationship between two elements. To those skilled in the art, the specific meaning of the above terms in the context of the present disclosure can be understood according to specific situations.

In the present disclosure, unless otherwise expressly specified and limited, a first feature being "above" or "under" a second feature may refer to direct contact between the first and second features, or it may refer to indirect contact between the first and second features, that is, contact through a separate feature therebetween. The first feature being "over", "on" and "above" the second feature may refer to the first feature being directly above, diagonally above the second feature, or simply indicate that the first feature is horizontally higher than the second feature. The first feature being "under", "down" and "below" the second feature may refer to the first feature being directly below, diagonally below the second feature, or simply indicate that the first feature is horizontally less than the second feature.

In order to make those skilled in the art better understand the technical solutions of the present disclosure, the disclosure will be further described in detail below with reference to the accompanying drawings.

Figure 1:
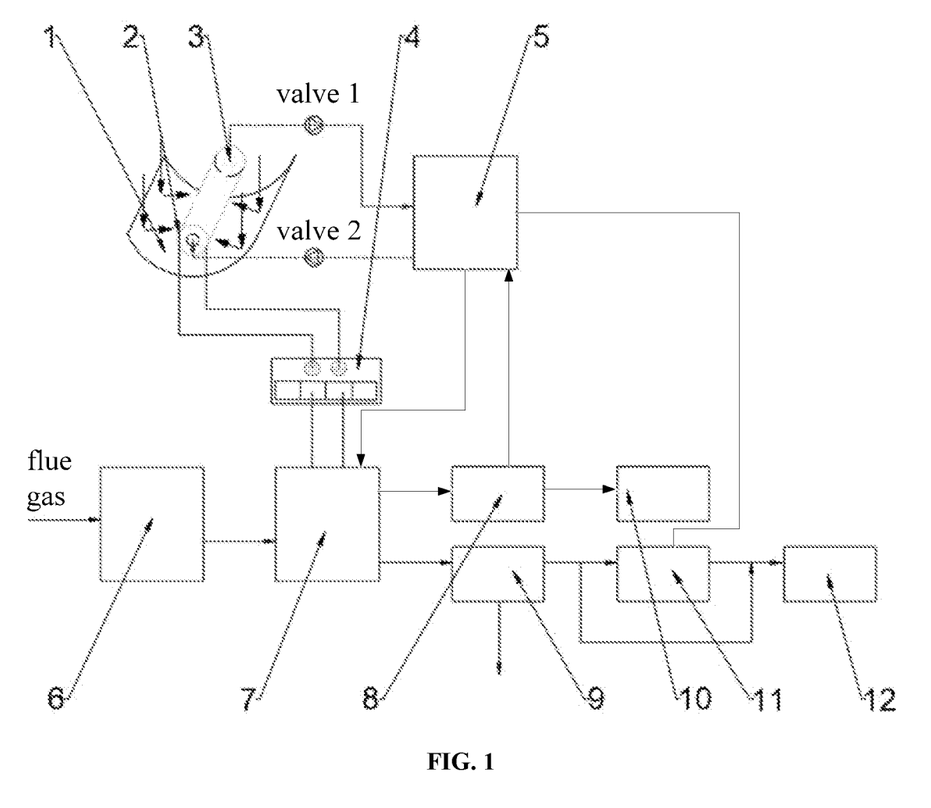
FIG. 1 is a structural diagram of a system for treating flue gas of a boiler based on solar energy according to an embodiment of the present disclosure.
Figure 2:
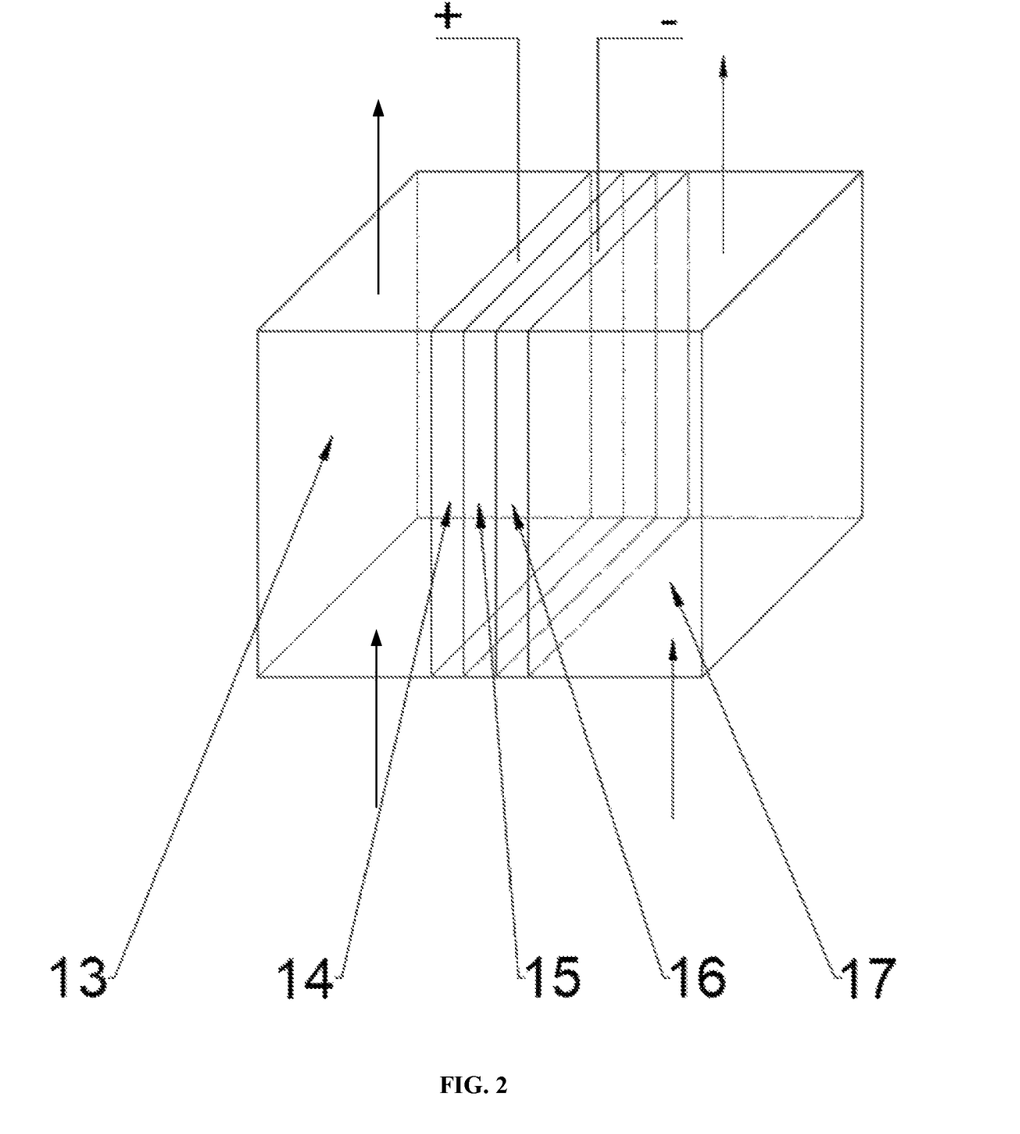
FIG. 2 is a schematic diagram of single electrolytic cell in the system for treating the flue gas of the boiler based on the solar energy according to an embodiment of the present disclosure.

In an embodiment, as shown in FIGS. 1-2, a system for treating flue gas of a boiler based on solar energy includes a solar energy utilization module, a flue gas decarbonization module and an electrolyte circulation module.

The solar energy utilization module includes:
a parabolic concentrator 1 configured to gather sunlight;
a heat collector 3 placed at a focal point of the parabolic concentrator 1;
a photovoltaic cell 2 attached to the heat collector 3 to absorb the sunlight and photoelectrically convert the sunlight into electrical energy;
a heat pump 5 connected to the heat collector 3 via a first valve and a second valve for thermal circulation; and
a power distribution control module 4 including:
a circuit controller configured to control a operation of a circuit;
a power storage unit configured to store excess electrical energy generated by the photovoltaic cell 2 and supply the electrical energy to outside;
an inverter configured to convert direct current into alternating current; and
a distribution box connected to the inverter to rectify and distribute the electrical energy.

The flue gas decarbonization module includes:
a flue gas pretreatment chamber 6 connected to a flue gas duct of the boiler to remove dust, sulfur oxides and nitrogen oxides from the flue gas and increase humidity of the flue gas;
a carbon dioxide electrolysis chamber connected to the flue gas pretreatment chamber 6 and the power distribution control module 4 for electrolyzing and reducing carbon dioxide in the flue gas by the direct current to generate liquid phase hydrocarbon fuel products and gas phase hydrocarbon fuel products, where the carbon dioxide electrolysis chamber includes a liquid phase outlet configured to discharge the liquid phase hydrocarbon fuel products and a gas phase outlet configured to discharge a mixture including the gas phase hydrocarbon fuel products;
a gas phase separation chamber 9 connected to the gas phase outlet to separate carbon monoxide, hydrogen, methane and ethylene from the mixture and discharge separated gas phase products;
a Fischer-Tropsch reaction chamber connected to the gas phase separation chamber 9 to pass the separated carbon monoxide and hydrogen into a flowing reaction cell for a Fischer-Tropsch reaction to generate high hydrocarbons in a liquid phase, and
a first product storage chamber 12 connected to the gas phase separation chamber and the Fischer-Tropsch reaction chamber to store the carbon monoxide, the hydrogen, the methane, the ethylene and the high hydrocarbons.

The electrolyte circulation module includes:
a liquid phase product separation chamber 8 connected to the liquid phase outlet to separate formic acid, methanol and ethanol in the liquid phase hydrocarbon fuel products so as to generate liquid phase products, and separate and replenish electrolyte;
an electrolyte cooling circulation chamber connected to the liquid phase product separation chamber to cool circulated electrolyte; and
a second product storage chamber 10 connected to the liquid phase product separation chamber to store the liquid phase products.

In an embodiment of the system for treating the flue gas of the boiler based on the solar energy, the heat pump 5 includes a compressor, a condenser, a throttle valve and an evaporator. A liquid refrigerant passes through the throttle valve to the evaporator, and absorbs heat from the circulated electrolyte therein, then passes through the compressor. A high-temperature gaseous refrigerant releases heat in the condenser to a working fluid circulated in the heat collector 3.

In an embodiment of the system for treating the flue gas of the boiler based on the solar energy, the power storage unit includes a lithium battery pack.

In an embodiment of the system for treating the flue gas of the boiler based on the solar energy, the carbon dioxide electrolysis chamber 7 includes an electrocatalytic reduction apparatus formed by bonding a plurality of single electrolytic cells. The single electrolytic cell includes:

an ion exchange membrane 15;

an anode 14 positioned on a side of the ion exchange membrane 15;

a cathode 16 positioned on another side of the ion exchange membrane 15 opposite to the anode 14;

a liquid phase flow path 13 positioned on a side of the anode 14 away from the ion exchange membrane 15 to circulate the electrolyte, and a gas phase flow path 17 positioned on a side of the cathode 16 away from the ion exchange membrane 15 to circulate the flue gas.

In an embodiment of the system for treating the flue gas of the boiler based on the solar energy, material of the anode 14 is a nickel or platinum metal porous media, the ion exchange membrane 15 is an anion membrane, a cation membrane or a bipolar membrane, and the cathode 16 is porous carbon cloth or carbon fiber.

In an embodiment of the system for treating the flue gas of the boiler based on the solar energy, a side of the cathode 16 near the gas phase flow path 17 performs a hydrophobic treatment, a side of the cathode 16 near the ion exchange membrane 15 performs a hydrophilic treatment and the side of the cathode 16 near the ion exchange membrane 15 is loaded with catalyst nanoparticles, and porosity of the cathode 16 decreases from the side near the gas phase flow path 17 to the side near the ion exchange membrane 15.

In an embodiment of the system for treating the flue gas of the boiler based on the solar energy, the catalyst nanoparticles are nanoparticles of gold, silver, zinc, lead, indium, tin, bismuth, antimony, copper and alloys thereof. The nanoparticles are spherical with a diameter of 1-100 nm and the cathode 16 has a thickness of 1-100 μm.

In an embodiment of the system for treating the flue gas of the boiler based on the solar energy, the gas phase flow path 17 and the liquid phase flow path 13 are serpentine or cross type. The gas phase flow path 17 has a flow rate of 20-100 sccm and the liquid phase flow path 13 has a flow rate of 20-80 sccm.

In an embodiment of the system for treating the flue gas of the boiler based on the solar energy, the electrolyte is potassium hydroxide, sodium hydroxide, potassium bicarbonate or sodium bicarbonate with a concentration of 0.5-2 mol/L.

In another embodiment, a system for treating flue gas of a boiler based on solar energy includes a solar energy utilization module, a flue gas decarbonization module and an electrolyte circulation module.

The solar energy utilization module includes a concentrating part, a heat pump part and a power distribution control part.

The concentrating part includes:

a parabolic concentrator 1 configured to gather sunlight to increase energy density of light;

a photovoltaic cell 2, which is a flexible photovoltaic cell, attached to a heat collector 3 to absorb light energy reflected by the parabolic concentrator and photoelectrically convert the light energy into electrical energy; and a heat collector 3 configured to derive heat energy of the photovoltaic cell to heat an internal working fluid.

The heat pump part 5 is connected to the heat collector 3 via a first valve and a second valve. The heat pump part 5 includes a compressor, a condenser, a throttle valve and an evaporator. A liquid refrigerant with a low temperature and low pressure passes through the throttle valve to the evaporator, and absorbs heat from the circulated electrolyte therein, then passes through the compressor, and after that a gaseous refrigerant with a high temperature and high pressure releases heat in the condenser to a working fluid circulated in the heat collector and then the above steps are recycled. The working fluid in the heat collector with a high temperature and the circulated electrolyte in a carbon dioxide electrolysis chamber with a low temperature are provided.

The power distribution control part 4 includes: a circuit controller configured to control an operation of a circuit; a lithium battery configured to store excess electrical energy generated by the photovoltaic cell 2 and supply the electrical energy to outside; an inverter configured to convert direct current into alternating current; and a distribution box configured to rectify and distribute the electrical energy. The distribution box is electrically connected with a power supply line of the system for treating the flue gas of the boiler based on the solar energy.

The flue gas decarbonization module includes:

a flue gas pretreatment chamber 6 connected to a flue gas duct and configured to perform pretreatment such as filtering and spraying in an interior to remove dust, sulfur oxides and nitrogen oxides from the flue gas and increase humidity of the flue gas;

a carbon dioxide electrolysis chamber 7 connected to the flue gas discharged by the flue gas pretreatment chamber for electrolyzing and reducing carbon dioxide by the direct current to further remove sulfur oxides and nitrogen oxides in the flue gas while generating liquid phase hydrocarbon fuel products and gas phase hydrocarbon fuel products;

a gas phase separation chamber 9 connected to a gas outlet of the carbon dioxide electrolysis chamber to separate carbon monoxide, hydrogen, methane and ethylene from a mixture and discharge the separated gaseous mixture;

a Fischer-Tropsch reaction chamber 11 connected to the gas phase separation chamber to pass the separated carbon monoxide and hydrogen into a flowing reaction cell for a Fischer-Tropsch reaction to generate high hydrocarbons, and liquefied them under pressure; and a first product storage chamber 12 connected to the gas phase separation chamber to store final gas phase products.

The electrolyte circulation module includes:

a liquid phase product separation chamber 8 connected to a liquid phase outlet of the carbon dioxide electrolysis chamber to separate formic acid, methanol and ethanol from a mixture, and configured to separate and replenish the electrolyte; and a second product storage chamber 10 connected to the liquid phase product separation chamber to store final liquid phase products.

In the system for treating the flue gas of the boiler based on the solar energy, an electrocatalytic reduction apparatus of the carbon dioxide electrolysis chamber 7 is formed by bonding a plurality of single electrolytic cells. For the single electrolytic cell, it includes a liquid phase flow path 13, an anode electrode 14, an ion exchange membrane 15, a cathode electrode 16 and a gas phase flow path 17. The anode, membrane and cathode are integrally pressed. The liquid phase flow path is filled with the circulated electrolyte, and the gas phase flow path is filled with the pretreated flue gas.

In the system for treating the flue gas of the boiler based on the solar energy, material of the anode 14 in the carbon dioxide electrolysis chamber is a nickel or platinum metal, the ion exchange membrane 15 may be an anionic membrane, a cation membrane or a bipolar membrane, and the cathode 16 is porous carbon cloth or carbon fiber. A side of the cathode near the gas phase flow path performs a hydrophobic treatment, a side of the cathode near the membrane performs a hydrophilic treatment and the side of the cathode near the membrane is loaded with catalyst nanoparticles. Types of the catalyst may be gold, silver, zinc, lead, indium, tin, bismuth, antimony, copper and alloys thereof. Porosity of cathode decreases from the side near the gas phase flow path to the side near the membrane.

In the system for treating the flue gas of the boiler based on the solar energy, the cathode in the carbon dioxide electrolysis chamber has a thickness of 1-100 μm, and the catalyst nanoparticles are spherical or other shapes with a diameter of 1-100 nm.

In the system for treating the flue gas of the boiler based on the solar energy, supporting materials of the gas phase flow path and liquid phase flow path in the carbon dioxide electrolysis chamber are alkaline resistant polymer plastic or titanium plate. The gas phase flow path 17 and liquid phase flow path 13 are serpentine or cross type. The flow rate of the gas phase flow path is 20-100 sccm and the flow rate of the liquid phase flow path is 20-80 sccm.

In the system for treating the flue gas of the boiler based on the solar energy, the circulated electrolyte may be first main group element hydroxides or bicarbonates, such as potassium hydroxide, sodium hydroxide, potassium bicarbonate, sodium bicarbonate, with a concentration of 0.5-2 mol/L. During the recycling, in order to improve an efficiency of carbon dioxide electrocatalytic reduction, a temperature of the circulated electrolyte at an entrance of the carbon dioxide electrolysis chamber 7 is 5-15° C. For better heat dissipation, the carbon dioxide electrolysis chamber is also provided with heat dissipation equipment such as large fans.

In the system for treating the flue gas of the boiler based on the solar energy, after being cooled by the heat pump module 5, the circulated electrolyte is pumped into the carbon dioxide electrolysis chamber 7 for reduction. Then, the circulated electrolyte is separated by the liquid phase separation chamber 8 and returned to the heat pump module 5 for cooling to form a closed-loop electrolyte circulation pipeline.

In the system for treating the flue gas of the boiler based on the solar energy, the high-temperature working fluid in the heat collector, which is heated by the heat pump module, will heat a fluid media through an internal heat exchanger to supply heat required for the Fischer-Tropsch reaction with a high temperature in the Fischer-Tropsch reaction chamber 11.

In the system for treating the flue gas of the boiler based on the solar energy, the system includes a controller configured to control operations of the solar energy utilization module and the heat pump module. The controller includes a general purpose processor, a digital signal processor, a special purpose integrated circuit ASIC or a field programmable gate array FPGA. The controller includes a memory. The memory includes one or more read-only memory ROM, random access memory RAM, flash memory or electronically erasable programmable read-only memory EEPROM.

A method for treating flue gas of a boiler based on solar energy includes the following steps.

Sunlight is gathered on a surface of a heat collector at a focal point of a parabolic concentrator. A photoelectric effect is produced between the sunlight and a flexible photovoltaic cell attached to the heat collector to generate electricity. A surface photovoltaic cell is cooled through an internal working fluid by the heat collector. A fluid in the heat collector is transmitted to a heat pump module through a duct to indirectly absorb heat from circulated electrolyte by a compressor and an evaporator. The heat from the circulated electrolyte is transferred to the working fluid circulated in the heat collector by the heat pump module. Subsequently, heat from a heated high-temperature circulating working fluid is transferred to a Fischer-Tropsch reaction chamber through a heat exchanger to supply thermal catalytic reaction in the Fischer-Tropsch reaction chamber.

Dust, sulfur oxides and nitrogen oxides are removed from the flue gas and humidity of the flue gas is increased by passing the flue gas through a flue gas pretreatment chamber. The flue gas is reduced to liquid phase hydrocarbon fuel products and gas phase hydrocarbon fuel products by entering the flue gas into a gas phase fluid path in a carbon dioxide electrolysis chamber. Where the circulated electrolyte has a temperature of 5-15° C. at an entrance of the carbon dioxide electrolysis chamber.

Carbon monoxide, hydrogen, methane and ethylene are separated from a mixture comprising the gas phase hydrocarbon fuel products by a gas phase separation chamber. The separated gas phase products are discharged and stored in a first product storage chamber. Where the carbon monoxide and the hydrogen enter the Fischer-Tropsch reaction chamber for a Fischer-Tropsch reaction to generate high hydrocarbons in a liquid phase.

Formic acid, methanol and ethanol are separated from the liquid phase hydrocarbon fuel products by a liquid phase separation chamber to generate liquid phase products. And the liquid phase products are stored in a second product storage chamber. Where electrolyte in the liquid phase separation chamber is recycled through an electrolyte cooling circulation chamber.

The sunlight is gathered on the surface of the heat collector at the focal point of the parabolic concentrator 1. The photoelectric effect is produced between the sunlight and the flexible photovoltaic cell 2 attached to the heat collector to generate electricity. The surface photovoltaic cell is cooled through the internal working fluid by the heat collector 3.

The working fluid in the heat collector is transmitted to the heat pump module 5 through the duct to indirectly absorb the heat from the circulated electrolyte by the compressor and the evaporator to obtain a working fluid in the heat collector with a higher temperature and circulated electrolyte with a low temperature. The heat from the working fluid in the heat collector with a high temperature is transferred to the Fischer-Tropsch reaction chamber 11 through the internal heat exchanger to supply the heat required by the Fischer-Tropsch reaction with the high temperature.

A part of the electrical energy generated by the photovoltaic cell 2 is directly supplied to the carbon dioxide electrolysis chamber. Another part of the electrical energy is converted into alternating current by the inverter and rectified and distributed to the power supply line of the system by the distribution box. The circuit controller provided on the power supply line is configured to control the operation of the circuit. The lithium battery provided in the power supply line is configured to store the excess electric energy and supply the electric energy to the power supply line.

The flue gas passes through the flue gas pretreatment chamber to the gas phase flow path of an electrolytic cell stack in the carbon dioxide electrolysis chamber 7 and is reduced to hydrogen and hydrocarbon products such as carbon monoxide, formic acid, methane, methanol, ethane, ethylene and ethanol, by the catalyst inside a cathode porous electrode. The gas phase products are separated by the gas phase separation chamber 9 and further enter the Fische-Tropsch reaction chamber 11 for reaction to generate high carbon products, which are stored under high pressure in the first product storage chamber 12, and the separated exhaust gas is directly discharged into atmosphere. The liquid phase products are separated by the liquid phase separation chamber 8 and stored in the second product storage chamber 10. After the circulated electrolyte is separated and replenished, it is sent to the heat pump for re-cooling to realize electrolyte recycling.

Comparing with the conventional art, the present disclosure makes use of the thermal and electrical energy generated by the solar energy to supply the electrocatalytic reduction of the carbon dioxide and the Fischer-Tropsch reaction with the high temperature. Desulfurization, denitrification, dusting and decarbonization of the flue gas are maximally realized in the pretreatment chamber and a carbon dioxide reaction chamber and a secondary reaction is performed on the products for storage. The present disclosure utilizes full wavebands of the solar energy for generating heat and electricity simultaneously to supply the heat energy required for treating the flue gas and the electrical energy required for the system operation, and has significant social and circular economic benefits, and can be widely used in the field of the boiler exhaust gas treatment.

Finally, it should be noted that the described embodiments are only a part of the embodiments of this application, not all of them. Based on the embodiments of the present disclosure, all other embodiments obtained by those skilled in the art without any creative efforts shall fall within the scope of the present disclosure.

Certain exemplary embodiments of the present disclosure have been described above by way of illustration only. It goes without saying that the described embodiments can be amended in various different ways for those skilled in the art without departing from the spirit and scope of the present disclosure. Accordingly, the foregoing accompanying drawings and description are illustrative in nature and should not be construed as limiting the scope of the claims of the present disclosure.

What is claimed is:

1. A system for treating flue gas of a boiler based on solar energy, comprising a solar energy utilization module, a flue gas decarbonization module and an electrolyte circulation module,
    wherein the solar energy utilization module comprises:
    a parabolic concentrator configured to gather sunlight;
    a heat collector placed at a focal point of the parabolic concentrator;
    a photovoltaic cell attached to the heat collector to absorb the sunlight and photoelectrically convert the sunlight into electrical energy;
    a heat pump connected to the heat collector via a first valve and a second valve for thermal circulation; and
    a power distribution control module comprising:
        a circuit controller configured to control an operation of a circuit;
        a power storage unit configured to store excess electrical energy generated by the photovoltaic cell and supply the electrical energy to outside;
        an inverter configured to convert direct current into alternating current; and
        a distribution box connected to the inverter to rectify and distribute the electrical energy;
    wherein the flue gas decarbonization module comprises:
    a flue gas pretreatment chamber connected to a flue gas duct of the boiler to remove dust, sulfur oxides and nitrogen oxides from the flue gas and increase humidity of the flue gas;
    a carbon dioxide electrolysis chamber connected to the flue gas pretreatment chamber and the power distribution control module for electrolyzing and reducing carbon dioxide in the flue gas by the direct current to generate liquid phase hydrocarbon fuel products and gas phase hydrocarbon fuel products; wherein the carbon dioxide electrolysis chamber comprises a liquid phase outlet configured to discharge the liquid phase hydrocarbon fuel products and a gas phase outlet configured to discharge a mixture comprising the gas phase hydrocarbon fuel products;
    a gas phase separation chamber connected to the gas phase outlet to separate carbon monoxide, hydrogen, methane and ethylene from the mixture and discharge separated gas phase products;
    a Fischer-Tropsch reaction chamber connected to the gas phase separation chamber to pass the separated carbon monoxide and hydrogen into a flowing reaction cell for a Fischer-Tropsch reaction to generate high hydrocarbons in a liquid phase, and
    a first product storage chamber connected to the gas phase separation chamber and the Fischer-Tropsch reaction chamber to store the carbon monoxide, the hydrogen, the methane, the ethylene and the high hydrocarbons;
    wherein the electrolyte circulation module comprises:
    a liquid phase product separation chamber connected to the liquid phase outlet to separate formic acid, methanol and ethanol in the liquid phase hydrocarbon fuel products so as to generate liquid phase products, and separate and replenish electrolyte;
    an electrolyte cooling circulation chamber connected to the liquid phase product separation chamber to cool circulated electrolyte; and
    a second product storage chamber connected to the liquid phase product separation chamber to store the liquid phase products.

2. The system for treating the flue gas of the boiler based on the solar energy according to claim 1, wherein the heat pump comprises a compressor, a condenser, a throttle valve and an evaporator; wherein a liquid refrigerant passes through the throttle valve to the evaporator, absorbs heat from the circulated electrolyte therein, and then passes through the compressor, and a high-temperature gaseous refrigerant releases heat in the condenser to a working fluid circulated in the heat collector.

3. The system for treating the flue gas of the boiler based on the solar energy according to claim 1, wherein the power storage unit comprises a lithium battery pack.

4. The system for treating the flue gas of the boiler based on the solar energy according to claim 1, wherein the carbon dioxide electrolysis chamber comprises an electrocatalytic reduction apparatus formed by bonding a plurality of single electrolytic cells; wherein the single electrolytic cell comprises:
- an ion exchange membrane;
- an anode positioned on a side of the ion exchange membrane;
- a cathode positioned on another side of the ion exchange membrane opposite to the anode;
- a liquid phase flow path positioned on a side of the anode away from the ion exchange membrane to circulate the electrolyte, and
- a gas phase flow path positioned on a side of the cathode away from the ion exchange membrane to circulate the flue gas.

5. The system for treating the flue gas of the boiler based on the solar energy according to claim 4, wherein material of the anode is a nickel or platinum metal porous media, the ion exchange membrane is an anion membrane, a cation membrane or a bipolar membrane, and the cathode is porous carbon cloth or carbon fiber.

6. The system for treating the flue gas of the boiler based on the solar energy according to claim 5, wherein a side of the cathode near the gas phase flow path performs a hydrophobic treatment, a side of the cathode near the ion exchange membrane performs a hydrophilic treatment and the side of the cathode near the ion exchange membrane is loaded with catalyst nanoparticles, and porosity of the cathode decreases from the side near the gas phase flow path to the side near the ion exchange membrane.

7. The system for treating the flue gas of the boiler based on the solar energy according to claim 6, wherein the catalyst nanoparticles are nanoparticles of gold, silver, zinc, lead, indium, tin, bismuth, antimony, copper and alloys thereof, the nanoparticles are spherical with a diameter of 1-100 nm and the cathode has a thickness of 1-100 µm.

8. The system for treating the flue gas of the boiler based on the solar energy according to claim 4, wherein shapes of the gas phase flow path and the liquid phase flow path are serpentine or cross type, the gas phase flow path has a flow rate of 20-100 sccm and the liquid phase flow path has a flow rate of 20-80 sccm.

9. The system for treating the flue gas of the boiler based on the solar energy according to claim 1, wherein the electrolyte is potassium hydroxide, sodium hydroxide, potassium bicarbonate or sodium bicarbonate with a concentration of 0.5-2 mol/L.

10. A method for treating flue gas of a boiler based on solar energy according to a system for treating the flue gas of the boiler based on the solar energy, which comprises:
a solar energy utilization module, a flue gas decarbonization module and an electrolyte circulation module,
wherein the solar energy utilization module comprises:
a parabolic concentrator configured to gather sunlight;
a heat collector placed at a focal point of the parabolic concentrator;
a photovoltaic cell attached to the heat collector to absorb the sunlight and photoelectrically convert the sunlight into electrical energy;
a heat pump connected to the heat collector via a first valve and a second valve for thermal circulation; and
a power distribution control module comprising:
  a circuit controller configured to control an operation of a circuit;
  a power storage unit configured to store excess electrical energy generated by the photovoltaic cell and supply the electrical energy to outside;
  an inverter configured to convert direct current into alternating current; and
  a distribution box connected to the inverter to rectify and distribute the electrical energy;
wherein the flue gas decarbonization module comprises:
a flue gas pretreatment chamber connected to a flue gas duct of the boiler to remove dust, sulfur oxides and nitrogen oxides from the flue gas and increase humidity of the flue gas;
a carbon dioxide electrolysis chamber connected to the flue gas pretreatment chamber and the power distribution control module for electrolyzing and reducing carbon dioxide in the flue gas by the direct current to generate liquid phase hydrocarbon fuel products and gas phase hydrocarbon fuel products; wherein the carbon dioxide electrolysis chamber comprises a liquid phase outlet configured to discharge the liquid phase hydrocarbon fuel products and a gas phase outlet configured to discharge a mixture comprising the gas phase hydrocarbon fuel products;
a gas phase separation chamber connected to the gas phase outlet to separate carbon monoxide, hydrogen, methane and ethylene from the mixture and discharge separated gas phase products;
a Fischer-Tropsch reaction chamber connected to the gas phase separation chamber to pass the separated carbon monoxide and hydrogen into a flowing reaction cell for a Fischer-Tropsch reaction to generate high hydrocarbons in a liquid phase, and
a first product storage chamber connected to the gas phase separation chamber and the Fischer-Tropsch reaction chamber to store the carbon monoxide, the hydrogen, the methane, the ethylene and the high hydrocarbons;
wherein the electrolyte circulation module comprises:
a liquid phase product separation chamber connected to the liquid phase outlet to separate formic acid, methanol and ethanol in the liquid phase hydrocarbon fuel products so as to generate liquid phase products, and separate and replenish electrolyte;
an electrolyte cooling circulation chamber connected to the liquid phase product separation chamber to cool circulated electrolyte; and
a second product storage chamber connected to the liquid phase product separation chamber to store the liquid phase products;
wherein the method comprises:
gathering sunlight on a surface of the heat collector at the focal point of the parabolic concentrator; producing a photoelectric effect between the sunlight and a flexible photovoltaic cell attached to the heat collector to generate electricity; cooling a surface photovoltaic cell through an internal working fluid by the heat collector; transmitting a fluid in the heat collector to a heat pump module through a duct to indirectly absorb heat from the circulated electrolyte by a compressor and an evaporator; transferring the heat from the circulated electrolyte to the working fluid circulated in the heat collector by the heat pump module; subsequently, transferring heat from a heated high-temperature circulating working fluid to the Fischer-Tropsch reaction chamber through a heat exchanger to supply thermal catalytic reaction in the Fischer-Tropsch reaction chamber;
removing the dust, the sulfur oxides and the nitrogen oxides from the flue gas and increasing the humidity of the flue gas by passing the flue gas through the flue gas pretreatment chamber; reducing the flue gas to the liquid phase hydrocarbon fuel products and the gas phase hydrocarbon fuel products by entering the flue gas into a gas phase fluid path in the carbon dioxide electrolysis chamber, wherein the circulated electrolyte has a temperature of 5-15° C. at an entrance of the carbon dioxide electrolysis chamber;

separating the carbon monoxide, the hydrogen, the methane and the ethylene from the mixture comprising the gas phase hydrocarbon fuel products by the gas phase separation chamber; discharging the separated gas phase products and storing the separated gas phase products in the first product storage chamber; wherein the carbon monoxide and the hydrogen enter the Fischer-Tropsch reaction chamber for the Fischer-Tropsch reaction to generate the high hydrocarbons in the liquid phase; and separating the formic acid, the methanol and the ethanol from the liquid phase hydrocarbon fuel products by a liquid phase separation chamber to generate the liquid phase products and, storing the liquid phase products in the second product storage chamber; wherein the electrolyte in the liquid phase separation chamber is recycled through the electrolyte cooling circulation chamber.

11. The method for treating the flue gas of the boiler based on the solar energy according to claim 10, wherein the heat pump comprises the compressor, a condenser, a throttle valve and the evaporator; wherein a liquid refrigerant passes through the throttle valve to the evaporator, absorbs heat from the circulated electrolyte therein, and then passes through the compressor, and a high-temperature gaseous refrigerant releases heat in the condenser to the working fluid circulated in the heat collector.

12. The method for treating the flue gas of the boiler based on the solar energy according to claim 10, wherein the power storage unit comprises a lithium battery pack.

13. The method for treating the flue gas of the boiler based on the solar energy according to claim 10, wherein the carbon dioxide electrolysis chamber comprises an electrocatalytic reduction apparatus formed by bonding a plurality of single electrolytic cells;

wherein the single electrolytic cell comprises:
an ion exchange membrane;
an anode positioned on a side of the ion exchange membrane;
a cathode positioned on another side of the ion exchange membrane opposite to the anode;
a liquid phase flow path positioned on a side of the anode away from the ion exchange membrane to circulate the electrolyte, and
a gas phase flow path positioned on a side of the cathode away from the ion exchange membrane to circulate the flue gas.

14. The method for treating the flue gas of the boiler based on the solar energy according to claim 13, wherein material of the anode is a nickel or platinum metal porous media, the ion exchange membrane is an anion membrane, a cation membrane or a bipolar membrane, and the cathode is porous carbon cloth or carbon fiber.

15. The method for treating the flue gas of the boiler based on the solar energy according to claim 14, wherein a side of the cathode near the gas phase flow path performs a hydrophobic treatment, a side of the cathode near the ion exchange membrane performs a hydrophilic treatment and the side of the cathode near the ion exchange membrane is loaded with catalyst nanoparticles, and porosity of the cathode decreases from the side near the gas phase flow path to the side near the ion exchange membrane.

16. The method for treating the flue gas of the boiler based on the solar energy according to claim 15, wherein the catalyst nanoparticles are nanoparticles of gold, silver, zinc, lead, indium, tin, bismuth, antimony, copper and alloys thereof, the nanoparticles are spherical with a diameter of 1-100 nm and the cathode has a thickness of 1-100 μm.

17. The method for treating the flue gas of the boiler based on the solar energy according to claim 13, wherein shapes of the gas phase flow path and the liquid phase flow path are serpentine or cross type, the gas phase flow path has a flow rate of 20-100 sccm and the liquid phase flow path has a flow rate of 20-80 sccm.

18. The method for treating the flue gas of the boiler based on the solar energy according to claim 10, wherein the electrolyte is potassium hydroxide, sodium hydroxide, potassium bicarbonate or sodium bicarbonate with a concentration of 0.5-2 mol/L.

* * * * *